(12) United States Patent
Huang et al.

(10) Patent No.: US 10,690,926 B1
(45) Date of Patent: Jun. 23, 2020

(54) NEAR-EYE AUGMENTED REALITY DEVICE

(71) Applicant: NATIONAL CHIAO TUNG UNIVERSITY, Hsinchu (TW)

(72) Inventors: Yi-Pai Huang, Zhubei (TW); Zong Qin, Hsinchu (TW); Ping-Yen Chou, Taipei (TW); Jui-Yi Wu, Toufen (TW); Yu-Ting Chen, Minxiong Township (TW); Wei-An Chen, Zhubei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/405,155

(22) Filed: May 7, 2019

(30) Foreign Application Priority Data

Dec. 27, 2018 (TW) .............................. 107147361 A

(51) Int. Cl.
  *G02B 27/00* (2006.01)
  *G02B 27/01* (2006.01)
  *G02B 27/28* (2006.01)
  *G06T 19/00* (2011.01)

(52) U.S. Cl.
  CPC ....... *G02B 27/0172* (2013.01); *G02B 27/281* (2013.01); *G06T 19/006* (2013.01)

(58) Field of Classification Search
  None
  See application file for complete search history.

(56) References Cited

U.S. PATENT DOCUMENTS

| | | |
|---|---|---|
| 9,239,453 B2 | 1/2016 | Cheng et al. |
| 2013/0009853 A1 | 1/2013 | Hesselink et al. |
| 2016/0161747 A1* | 6/2016 | Osterhout ............ G02B 27/283 345/8 |
| 2017/0249745 A1* | 8/2017 | Fiala ....................... G06T 7/246 |
| 2017/0295229 A1* | 10/2017 | Shams ............... H04L 67/1095 |
| 2017/0315356 A1 | 11/2017 | Tervo |
| 2018/0113590 A1* | 4/2018 | Osterhout ............... G06F 3/011 |

OTHER PUBLICATIONS

Jian Han, Juan Liu, Xincheng Yao, and Yongtian Wang "Portable waveguide display system with a large field of view by integrating freeform elements and volume holograms" Optics Express, vol. 23, No. 3 (2015).
Xinda Hu and Hong Hua "High-resolution optical see-through multi-focalplane head-mounted display using freeform optics" Optics Express, vol. 22, No. 11 (2014).

(Continued)

*Primary Examiner* — Martin Mushambo
(74) *Attorney, Agent, or Firm* — Michael Best & Friedrich LLP

(57) ABSTRACT

A near-eye augmented reality device includes an imaging unit including a plurality of imaging portions having birefringence and positive diopter, a lighting unit, and a polarization-control unit. The lighting unit is spaced apart from the imaging unit, and includes a base plate and a plurality of pixel modules. The base plate has a first surface proximal to the imaging unit, and an opposite second surface. Each of the pixel modules is operative to produce an imaging light directed towards the imaging unit. The polarization-control unit is operative to control polarization states of the image light and an ambient light.

16 Claims, 5 Drawing Sheets

(56) References Cited

OTHER PUBLICATIONS

Edward DeHoog, Jason Holmstedt, and Tin Aye "Field of view of limitations in see-through HMDs using geometric waveguides" Applied Optics, vol. 55, No. 22 (2016).

Kiyoshi Kiyokawa "A Wide Field of View Head Mounted Display and Its Effects on Search Performance in Augmented Reality" In SID Symposium Digest of Technical Papers, vol. 47, No. 1, pp. 452-455. 2016.

* cited by examiner

NEAR-EYE AUGMENTED REALITY DEVICE

CROSS-REFERENCE TO RELATED APPLICATION

This application claims priority of Taiwanese Invention Patent Application No. 107147361, filed on Dec. 27, 2018.

FIELD

The disclosure relates to an augmented reality device, more particularly to a near-eye augmented reality device.

BACKGROUND

An augmented reality (AR) device allows virtual display to combine and interact with real world scenes in a user's view. The AR device must use appropriate optical structures to produce optical see-through (OST) images. Conventional AR devices can be separated into two types: projector-style and waveguide-style.

A projector-style AR device uses a micro projector and a micro display to project the virtual image, and a partially-reflecting optical combiner to reflect and magnify the virtual image into the user's eye while letting the real world scenes through, combining the virtual image and the real world scenes to provide AR effect.

The optical combiner is usually a freeform optical component having optical power, and hence an extra freeform corrector is needed to correct for distortion of the real world scenes. Furthermore, the field of view (FOV) of the projector-style AR device is directly related to the size thereof. According to geometric optics, let the eye-relief of the projector-style AR device be D and FOV be $\alpha$, the diameter of the optical combiner must be larger than or equal to $2D \tan(\alpha/2)$. Thus, if the size of the projector-style AR device is to be kept compact, then the FOV thereof would not be large enough to allow for an immersive experience.

In a waveguide-style AR device, an optical component directs light emitted from a micro display into a waveguide, and the light is outputted into the user's eye from the waveguide using another optical component after transmitting a certain distance in the waveguide. Since the waveguide is light-transmissible, ambient light of the real world scenes can pass through the waveguide at the same time. The aforementioned optical components may be a geometric optical mirror, a diffractive optical element (DOE), or a holographic optical element (HOE).

However, the FOV of the waveguide-style AR device is also limited by the properties of the aforementioned optical components and by the condition for total internal reflection in the waveguide. Due to a number of restrictions, the diagonal FOV of the waveguide-style AR device is usually no larger than 50°.

SUMMARY

Therefore, the object of the disclosure is to provide a near-eye augmented reality device that can alleviate the drawbacks of the prior art.

According to one aspect of the disclosure, a near-eye augmented reality device includes an imaging unit, a lighting unit, and a polarization-control unit.

The imaging unit includes a plurality of imaging portions having birefringence and positive optical power.

The lighting unit is spaced apart from the imaging unit, and includes a light-transmissible base plate and a plurality of pixel modules. The base plate has a first surface proximal to the imaging unit, and a second surface opposite to the first surface. Each of the pixel modules is disposed spaced-apart from and corresponding to a respective one of the imaging portions and operative to produce an imaging light directed towards the imaging unit.

The polarization-control unit includes a plurality of first polarizers and a second polarizer. The first polarizers are respectively disposed on the pixel modules. The second polarizer is disposed on the second surface of the base plate.

When the imaging light passes through the first polarizers, the imaging light is converted to a first polarized light polarized in a first direction and is refracted by the imaging unit, and when an ambient light passes through the second polarizer, the ambient light is converted to a second polarized light polarized in a second direction which is transverse to the first direction and is not refracted by the imaging unit.

According to another aspect of the disclosure, a near-eye augmented reality device includes an imaging unit, a lighting unit, and a polarization-control unit.

The imaging unit includes a plurality of imaging portions having birefringence and positive optical power.

The lighting unit is spaced apart from the imaging unit and includes a light-transmissible base plate and a plurality of pixel elements that are disposed on the base plate and that are operative for producing an imaging light directed toward the imaging unit.

The polarization-control unit is spaced apart from the imaging unit, and includes an electrically controlled adjustment layer, a first polarizer and a second polarizer. The adjustment layer is disposed between the imaging unit and the first polarizer. The second polarizer is disposed on a side of the lighting unit opposite to the imaging unit.

The imaging light is split into a first polarized light polarized in a first direction and a second polarized light polarized in a second direction while passing through the imaging unit.

When a voltage is applied to the adjustment layer, the second polarized light polarized in the second direction is unchanged while passing through the adjustment layer, and when no voltage is applied to the adjustment layer, the second polarized light polarized in the second direction is changed to be polarized in the first direction while passing through the adjustment layer.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
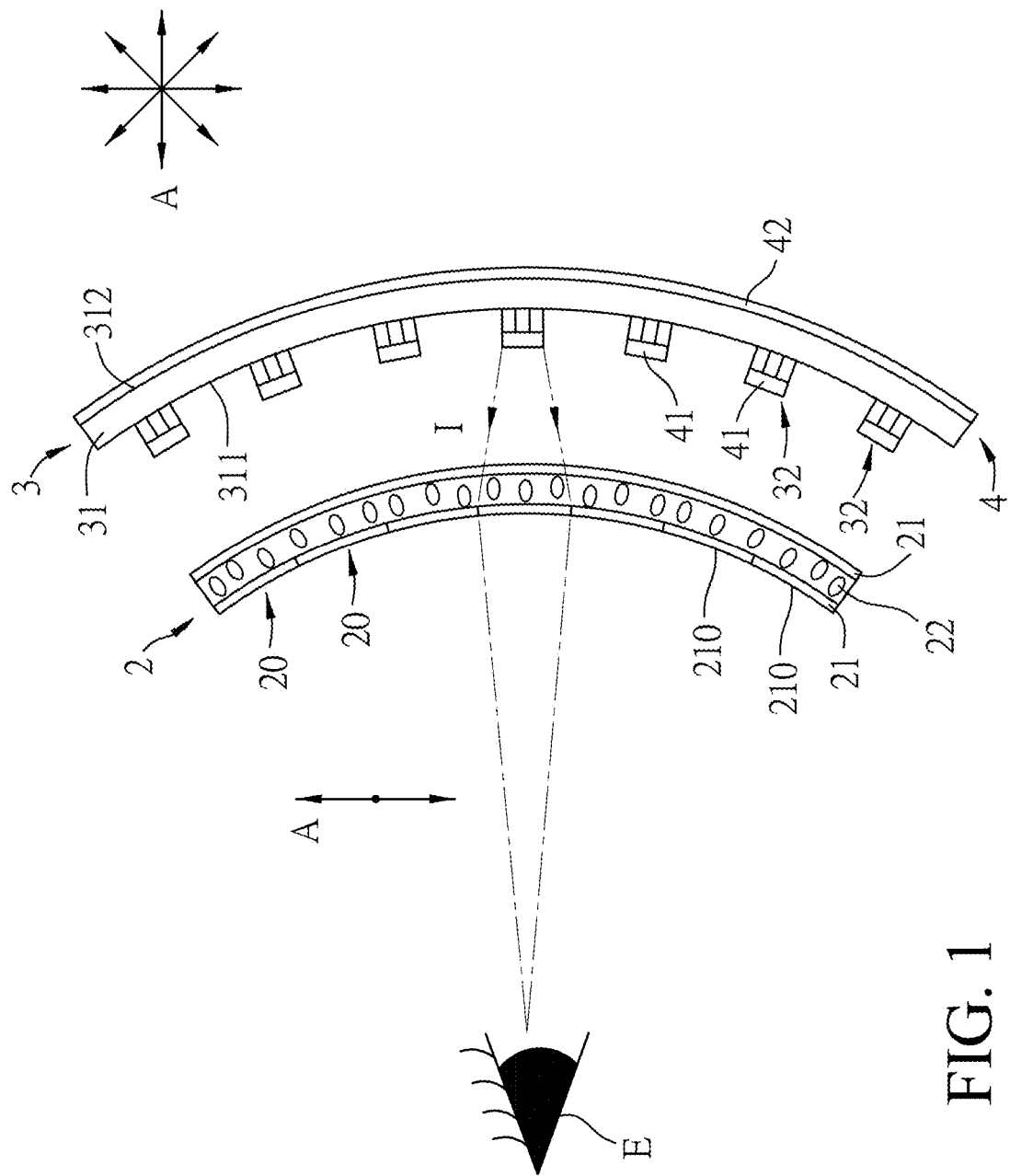
FIG. 1 is a schematically sectional view of a first embodiment of a near-eye augmented reality device according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
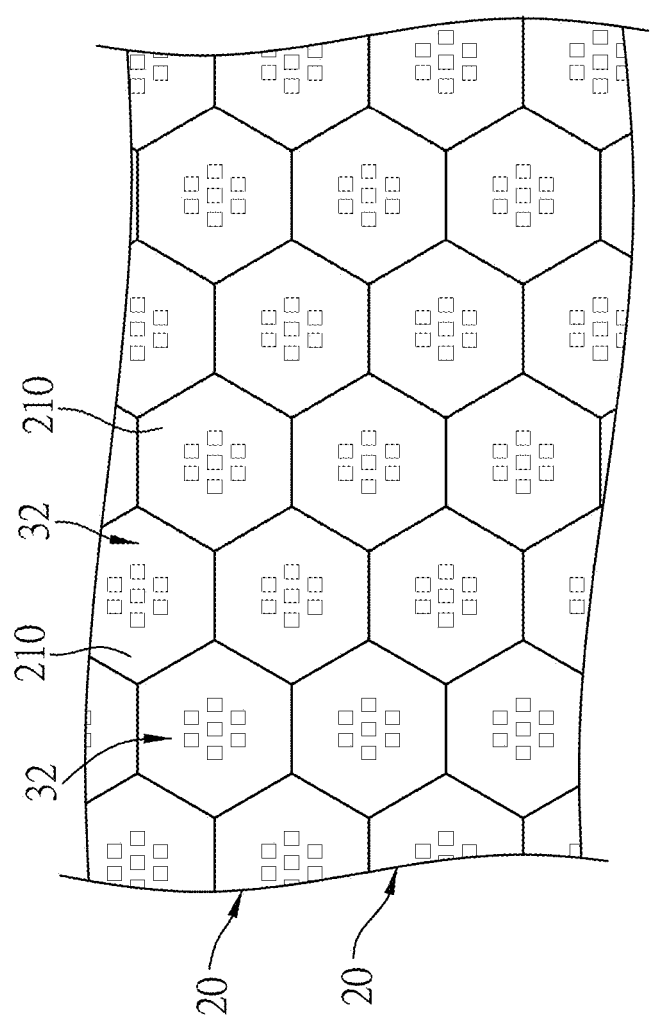
FIG. 2 is a fragmentarily and schematically front view of the first embodiment.

Referring to FIGS. 1 to 2, a first embodiment of a near-eye augmented reality device is adapted to be worn by a user in front of their eye (E). The near-eye augmented reality device includes an imaging unit 2 including a plurality of imaging portions 20 that have birefringence and positive optical power, a lighting unit 3, and a polarization-control unit 4.

The imaging unit 2 includes two spaced-apart substrates 21 with smooth surfaces, and a birefringent material 22 disposed between the substrates 21. One of the substrates 21 distal to the lighting unit 3 has a plurality of light-transmissible zones 210. The light-transmissible zones 210 cooperate with the birefringent material 22 to form the imaging portions 20. The birefringent material 22 is configurable to have positive optical power under a voltage, and thus the imaging portions 20 have birefringence and positive optical power.

In this embodiment, the substrates 21 are light-transmissible and are respectively exemplified to be made of a transparent glass formed with a transparent and electrically conductive layer, and the birefringent material 22 is exemplified to be liquid crystal. In this embodiment, each of the light-transmissible zones 210 is hexagonal in shape and has edges etched onto the one of the substrates 21 distal to the lighting unit 3, and the voltage is applied to the birefringent material 22 through the substrates 21 to twist the birefringent material of liquid crystal.

The lighting unit 3 is spaced apart from the imaging unit 2, and includes a light-transmissible base plate 31 with a smooth surface and a plurality of pixel modules 32. The base plate 31 has a first surface 311 proximal to the imaging unit 2, and a second surface 312 opposite to the first surface 311. Each of the pixel modules 32 is disposed spaced-apart from and corresponding to a respective one of the imaging portions 20 and is operative to produce an imaging light (I) directed towards the imaging unit 20.

Specifically, each of the pixel modules 32 corresponds in position to a respective one of the imaging portions 20, that is to say, the projections of the imaging member 20 onto the lighting unit 3 covers a respective one of the pixel modules 32. In this embodiment, each of the pixel modules 32 has a projection area on the light-transmissible zone 210 of the respective one of the imaging portions 20 that is not greater than 25% of a surface area of the imaging portion 20. In certain embodiments, the projection area of each of the pixel modules 32 is between 25% and 75% of the surface area of the respective imaging portion 20. The pixel modules 32 of the lighting unit 3 includes a plurality of pixels selected from micro-light emitting diodes (micro LEDs), organic light emitting diodes (OLEDs), or thin film transistors having liquid crystal (TFT-LCD). In this embodiment, the pixels of each of the pixel modules 32 are exemplified as micro LEDs and are seven in number, and the light emitting unit 3 is a curved micro LED display.

The polarization-control unit 4 includes a plurality of first polarizers 41 and a second polarizer 42. The first polarizers 41 are respectively disposed on the pixel modules 32. The second polarizer 42 is disposed on the second surface 312 of the light-transmissible base plate 31. When the imaging light (I) passes through the first polarizers 41, the imaging light (I) is converted to a first polarized light polarized in a first direction and is refracted by the imaging unit 2, and when an ambient light (A) passes through the second polarizer 42, the ambient light (A) is converted to a second polarized light polarized in a second direction which is transverse to the first direction and is not refracted by the imaging unit 2.

In this embodiment, the first polarizers 41 and the second polarizer 42 are linear polarizers transverse to each other, and the first polarized light is p-polarized (relative to a horizontal axis of the user), and the second polarized light is s-polarized.

Specifically, the first polarizers 41 convert the light passing therethrough into the p-polarized light and the second polarizer 42 converts the light passing therethrough into the s-polarized light. To utilize spatial multiplexing principle in the near-eye augmented reality device, the imaging units 20 having the positive optical power are disposed proximal to the eye (E) of the user, an appropriate spacing is kept between the imaging unit 2 and the lighting unit 3, and the polarization-control unit 4 is collaboratively used.

Specifically, because the imaging unit 2 has the birefringence, after the non-polarized imaging light (I) emitted by the pixel modules 32 is polarized by the first polarizers 41 into the p-polarized light, the p-polarized light is refracted by the imaging unit 2 into the eye (E) of the user. In order to improve the overall transmittance of the near-eye augmented reality device, the area of each of the pixel modules 32 may be reduced to 25% of the area of the respective light-transmissible zone 210. Doing so would decrease the effective lighting area, but the imaging portions 20 may magnify and join together the imaging light (I) projected by each of the pixel modules 32 due to the imaging portions 20 having the positive optical power and being stacked adjacently to each other, thus projecting into the eye (E) of the user an curved surface image with large field of view. This allows the near-eye augmented reality device of this disclosure to have both transmittance and field of view enhanced. Moreover, after the non-polarized ambient light (A) is polarized by the second polarizer 42 into s-polarized light, the s-polarized light is not refracted by the imaging unit 2, and thus enters the eye (E) of the user unperturbed, allowing the user to view normal ambient images.

In this embodiment, each of the imaging unit 2 and the lighting unit 3 has a curvature not less than an eye relief of the near-eye augmented reality device. At different viewing angles, the imaging light (I) emitted by the lighting unit 3 is refracted to enter the eye (E) of the user, being paraxial rays which has decreased imaging aberration, increasing the field of view, and allowing the volume of the near-eye augmented reality device to be condensed. Furthermore, the imaging portions 20 of the imaging unit 2 can focus the imaging lights (I) from the pixel modules 32 on a curved plane, producing a 3D image with depth and at different angles.

Figure 3:
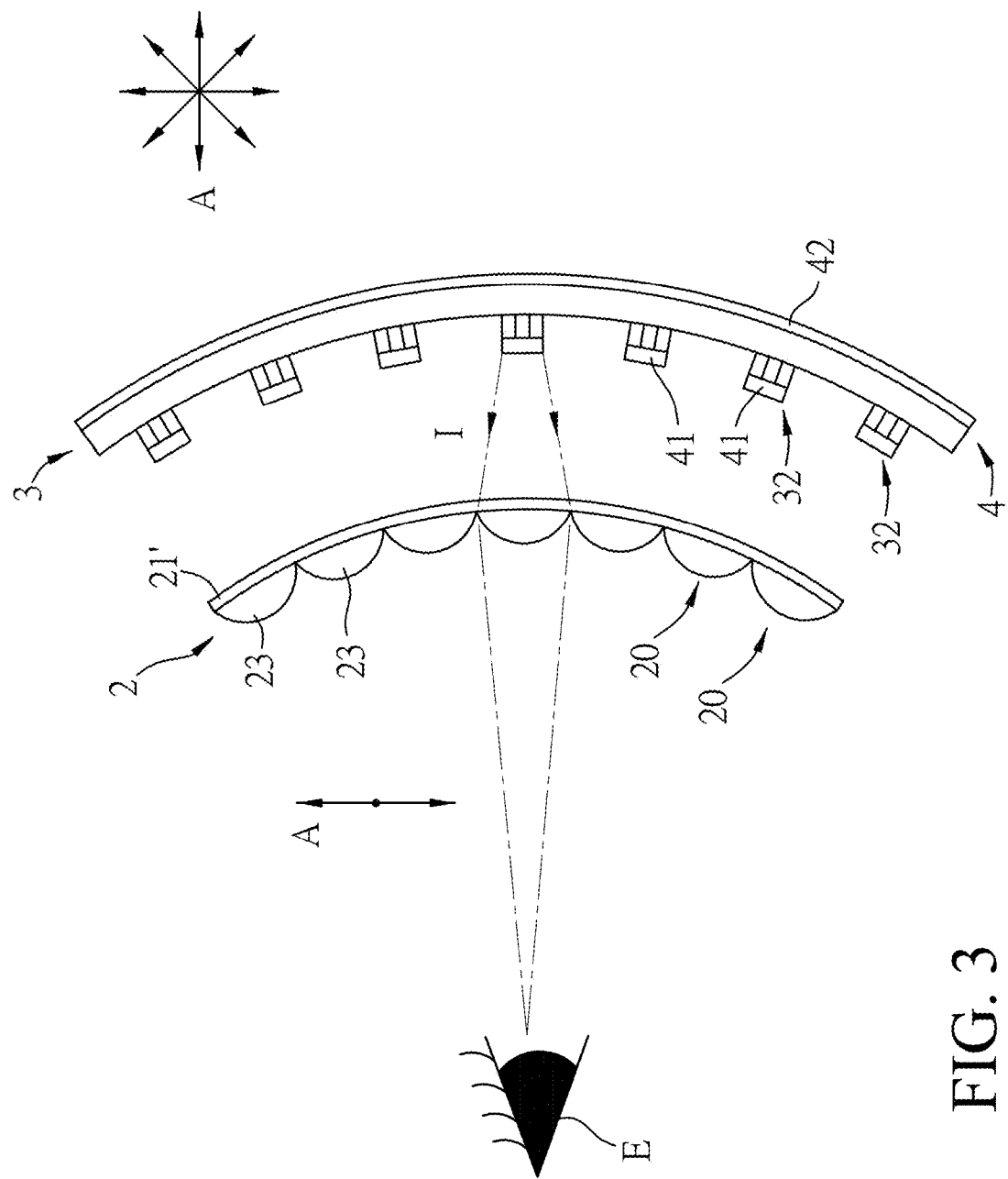
FIG. 3 is a schematically sectional view of a second embodiment of a near-eye augmented reality device according to the disclosure.

Referring to FIG. 3, a second embodiment of a near-eye augmented reality device is similar to the first embodiment, the difference being in the imaging unit 2. In the second embodiment, the imaging unit 2 includes a substrate 21' having two opposite surfaces, a plurality of protruding portions 23 formed on one of the opposite surfaces distal to the lighting unit 3, and a birefringent material 22 disposed on the substrate 21' and within the protruding portions 23. The protruding portions 23 cooperate with the birefringent material 22 therein to form the imaging portions 20. In this embodiment, the birefringent material 22 is selected from quartz or liquid crystal. Specifically, the protruding portions 23 are formed into a lens that has positive optical power, hence it is unnecessary to apply a voltage to the imaging portions 20 unlike in the first embodiment.

Figure 4:
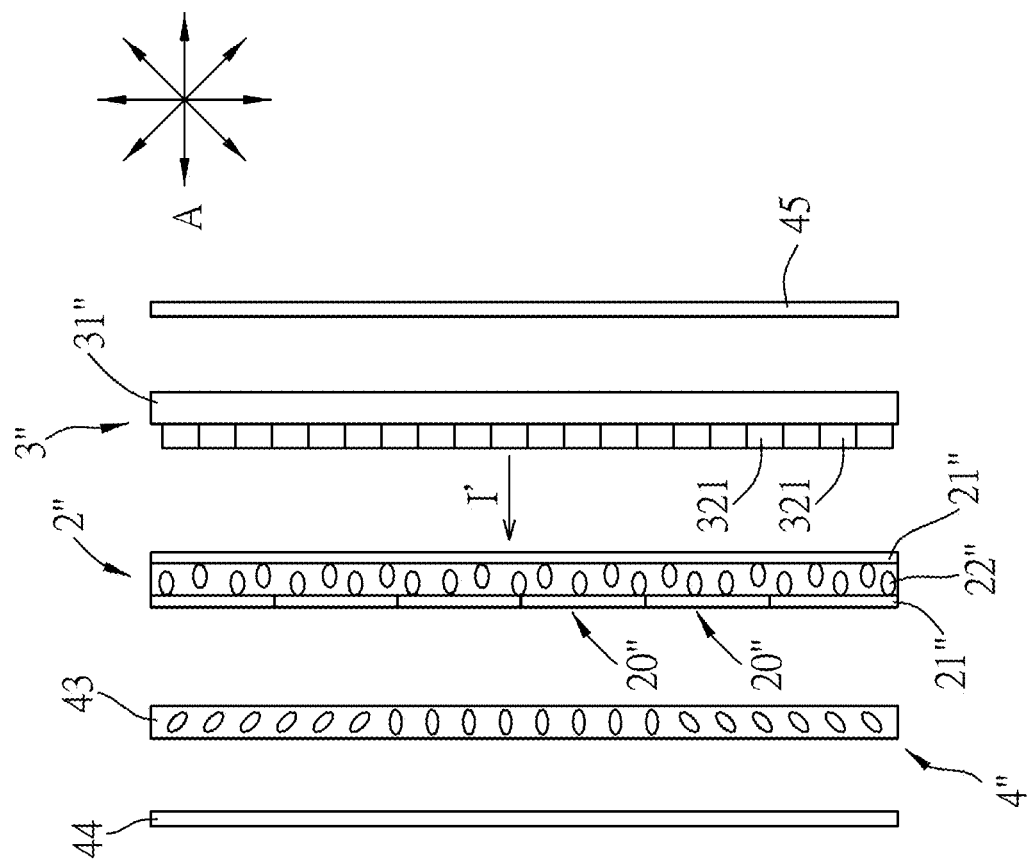
FIG. 4 is a schematically sectional view of a third embodiment of a near-eye augmented reality device according to the disclosure.
Figure 4:
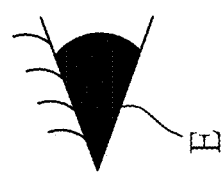
Figure 5:
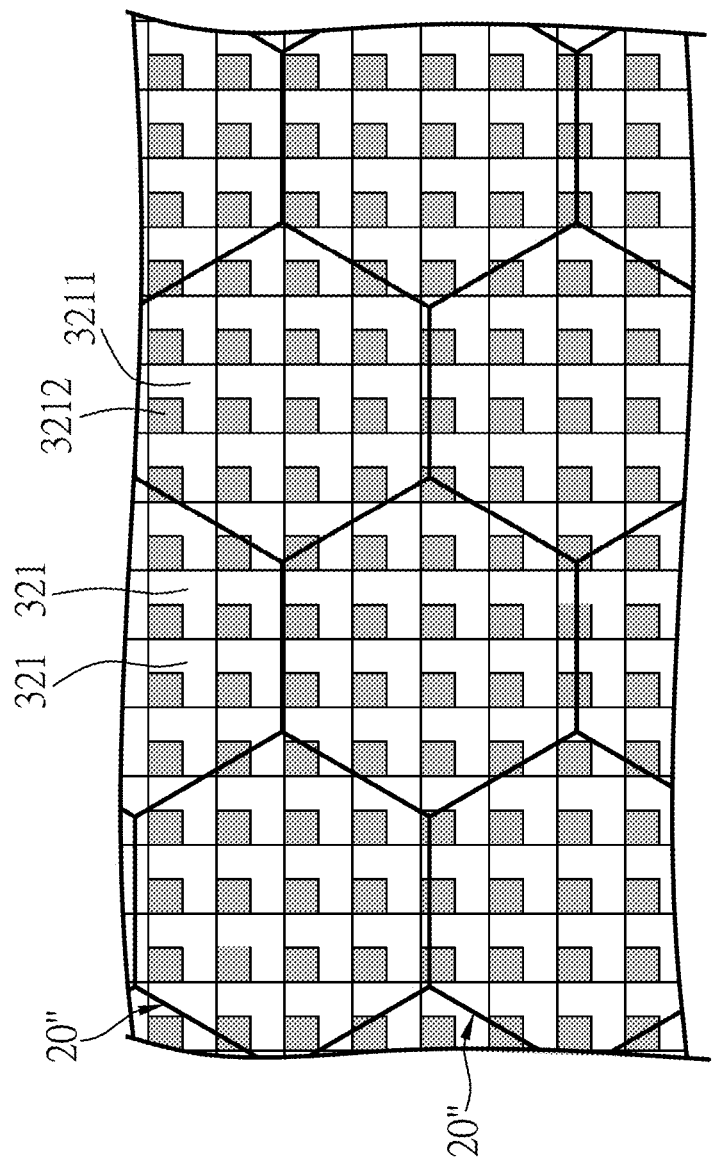
FIG. 5 is a fragmentarily and schematically front schematic view of the third embodiment.

Referring to FIGS. 4 and 5, a third embodiment of a near-eye augmented reality device of the disclosure includes an imaging unit 2" including a plurality of imaging portions 20" having birefringence and positive diopter, a lighting unit 3", and a polarization-control unit 4".

The imaging unit 2" is similar to the imagine unit 2 of the first embodiment and includes two spaced-apart substrates 21", a birefringent material 22" disposed between the substrates 21", and one of the substrates 21' distal to the lighting unit 3" have a plurality of light-transmissible zones 21". The birefringent material 22" is configurable to have positive optical power under a voltage. In this embodiment, the birefringent material 22 is liquid crystal. The light-transmissible zones 210" cooperate with the birefringent material 22" to form image portions 20".

In an alternative configuration of the third embodiment, the imaging unit 2" is similar to that of the second embodiment and includes the substrate 21' having two opposite surfaces, the protruding portions 23 formed on the one of the opposite surfaces distal to the lighting unit 3", and the birefringent material 22" disposed on the second substrate 21' and within the protruding portions 23. The protruding portions 23 cooperate with the birefringent material 22" therein to form the imaging portions 20". In this configuration, the birefringent material 22" is selected from quartz or liquid crystal.

The lighting unit 3" is spaced apart from the imaging unit 2" and includes a light-transmissible base plate 31" and a plurality of pixels 321 that are disposed on and covering the entire surface of the base plate 31", and that are operative for producing an imaging light (I') directed toward the imaging unit 2". In other words, the projection of the light-transmissible zones 210" towards the imaging unit 3" is filled with the pixels 321. Each of the pixels 321 are selected from micro-light emitting diodes (micro LEDs), organic light emitting diodes (OLEDs), or thin film transistors having liquid crystal (TFT-LCD). In this embodiment, the pixels 321 are exemplified as micro LEDs and each of the pixels 321 has a light-transmissible portion 3211 and a light-intransmissible portion 3212 (i.e. the micro LED) (see FIG. 5).

The polarization-control unit 4" is spaced apart from the imaging unit 2", and includes an electrically controlled adjustment layer 43, a first polarizer 44 and a second polarizer 45. The adjustment layer 43 is disposed between the imaging unit 2 and the first polarizer 44. The second polarizer 45 is disposed on a side of the lighting unit 3 opposite to the imaging unit 2". In this embodiment, the adjustment layer 43 is a twisted nematic liquid crystal module.

The imaging light (I) or an ambient light (A) is split into the first polarized light polarized in the first direction, i.e., the p-polarized light, and the second polarized light polarized in the second direction, i.e., the s-polarized light, while passing through the imaging unit 2". When a voltage is applied to the adjustment layer 43, the s-polarized light is unchanged, when no voltage is applied to the adjustment layer 43, the s-polarized light is changed to the p-polarized light.

Specifically, the third embodiment makes use of temporal multiplexing principles on two time states. In the first time state, the voltage is applied to the adjustment layer 43 such that after the non-polarized imaging light (I') emitted by the lighting unit 3" is split into the p-polarized and the s-polarized light by the imaging unit 2", only the p-polarized light may pass through the first polarizer 44 into the eye (E) of the user. Simultaneously, the non-polarized ambient light (A) is polarized to the s-polarized light by the first polarizer 45, not refracted by the imaging unit 2", and not polarized by the adjustment layer 43, and thus does not pass through the first polarizer 44 and is not seen by the user. In the second time state, no voltage is applied to the adjustment layer 43 and thus the adjustment layer 43 is able to change the s-polarized light into the p-polarized light. In the second time state, the lighting unit 3" does not emit light. The non-polarized ambient light (A) is polarized to the s-polarized light by the second polarizer 45, is not refracted by the imaging unit 3", and is changed into the p-polarized light by the adjustment layer 43. As the p-polarized light, the ambient light (A) may pass through the first polarizer 44 to be seen by the user. By switching between the first time state and the second time state at a high frequency, the effect of flicker fusion allows the user to perceive a smooth fusion of images at the two time states.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A near-eye augmented reality device comprising:
   an imaging unit including a plurality of imaging portions having birefringence and positive optical power;
   a lighting unit spaced apart from said imaging unit and including a light-transmissible base plate and a plurality of pixel modules, said base plate having a first surface proximal to said imaging unit and a second surface opposite to said first surface, each of said pixel modules being disposed spaced-apart from and corresponding to a respective one of said imaging portions and being operative to produce an imaging light directed toward said imaging unit; and
   a polarization-control unit including a plurality of first polarizers and a second polarizer, said first polarizers being respectively disposed on said pixel modules, said second polarizer being disposed on said second surface of said light-transmissible base plate;
   wherein when the imaging light passes through said first polarizers, said imaging light is converted to a first polarized light polarized in a first direction and is refracted by said imaging unit, and when an ambient light passes through said second polarizer, the ambient light is converted to a second polarized light polarized in a second direction which is transverse to said first direction and is not refracted by said imaging unit.

2. The near-eye augmented reality device as claimed in claim 1, wherein said imaging unit includes two spaced-apart substrates, and a birefringent material disposed between said substrates, one of said substrates distal to said lighting unit having a plurality of light-transmissible zones, said birefringent material is configurable to have positive optical power under a voltage, said light-transmissible zones cooperating with said birefringent material to form said imaging portions.

3. The near-eye augmented reality device as claimed in claim 2, wherein the birefringent material is liquid crystal.

4. The near-eye augmented reality device as claimed in claim 1, wherein said imaging unit includes a substrate having two opposite surfaces, a plurality of protruding portions formed on one of said opposite surfaces distal to said lighting unit, and a birefringent material disposed on said substrate and within said protruding portions, said protruding portions cooperating with said birefringent material therein to form said plurality of imaging portions.

5. The near-eye augmented reality device as claimed in claim 4, wherein said birefringent material is selected from quartz or liquid crystal.

6. The near-eye augmented reality device as claimed in claim 1, wherein each of said pixel modules has a projection area on a respective one of said imaging portions that is not greater than 25% of a surface area of said imaging portion.

7. The near-eye augmented reality device as claimed in claim 1, wherein said pixel modules of said lighting unit are selected from micro-light emitting diodes, organic light emitting diodes, or thin film transistors having liquid crystal.

8. The near-eye augmented reality device as claimed in claim 1, wherein said first polarized light is p-polarized, and said second polarized light is s-polarized.

9. The near-eye augmented reality device as claimed in claim 1, wherein each of said imaging unit and said lighting unit has a curvature not less than an eye relief of said near-eye augmented reality device.

10. A near-eye augmented reality device comprising:
an imaging unit including a plurality of imaging portions having birefringence and positive optical power;
a lighting unit spaced apart from said imaging unit and including a light-transmissible base plate and a plurality of pixel elements that are disposed on said base plate and that are operative for producing an imaging light directed toward the imaging unit; and
a polarization-control unit spaced apart from said imaging unit, and including an electrically controlled adjustment layer, a first polarizer and a second polarizer, said adjustment layer being disposed between said imaging unit and said first polarizer, said second polarizer being disposed on a side of said lighting unit opposite to said imaging unit;
wherein said imaging light is split into a first polarized light polarized in a first direction and a second polarized light polarized in a second direction while passing through said imaging unit; and
wherein when a voltage is applied to said adjustment layer, said second polarized light polarized in said second direction is unchanged while passing through said adjustment layer, when no voltage is applied to said adjustment layer, said second polarized light polarized in said second direction is changed to be polarized in said first direction while passing through said adjustment layer.

11. The near-eye augmented reality device as claimed in claim 10, wherein said imaging unit includes two spaced-apart substrates and a birefringent material disposed between said second substrates, said birefringent material is configurable to have positive optical power under a voltage.

12. The near-eye augmented reality device as claimed in claim 11, wherein the birefringent material is liquid crystal.

13. The near-eye augmented reality device as claimed in claim 10, wherein said imaging unit includes a substrate having two opposite surfaces, a plurality of protruding portions formed on one of said opposite surfaces distal to said lighting unit, and a birefringent material disposed on said substrate and within said protruding portions, said protruding portions cooperating with said birefringent material therein to form said plurality of imaging portions.

14. The near-eye augmented reality device as claimed in claim 13, wherein said birefringent material is selected from quartz or liquid crystal.

15. The near-eye augmented reality device as claimed in claim 10, wherein said adjustment layer is a twisted nematic liquid crystal module.

16. The near-eye augmented reality device as claimed in claim 10, wherein said first polarized light is p-polarized, and said second polarized light is s-polarized.

* * * * *